Feb. 11, 1930.  A. W. ASHWORTH  1,747,100
OIL GAUGE ROD WIPER
Filed March 3, 1928
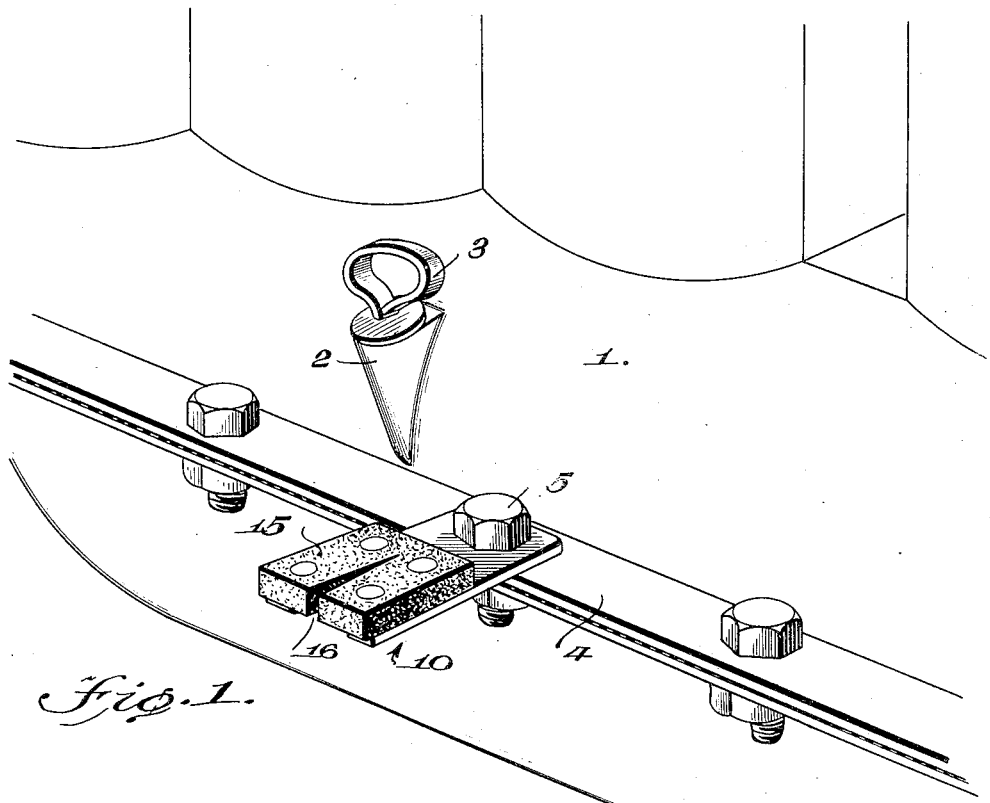
Fig. 1.
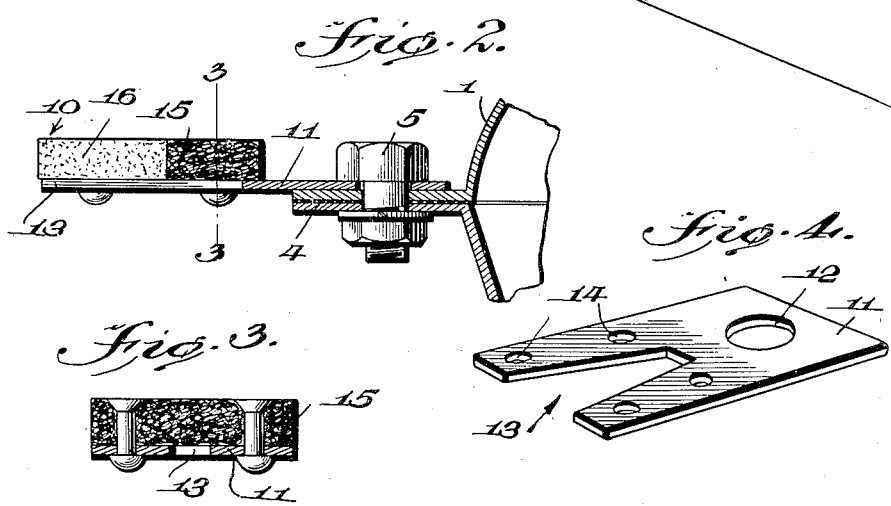
Fig. 2.
Fig. 4.
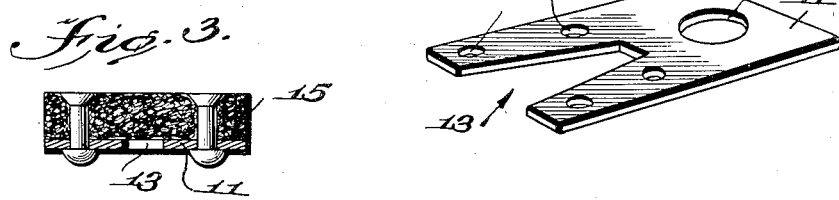
Fig. 3.
INVENTOR
A. W. Ashworth,
BY
ATTORNEYS Patented Feb. 11, 1930

1,747,100

UNITED STATES PATENT OFFICE

ALTON WILLIAM ASHWORTH, OF YOAKUM, TEXAS

OIL-GAUGE-ROD WIPER

Application filed March 3, 1928. Serial No. 258,810.

This invention relates generally to wipers and more particularly to an oil gauge wiper for use in connection with automobile gauge rods.

It is well known that in many makes of automobiles, the oil in the crank case is measured by means of a gauge rod which must be wiped before each use to ensure the amount of oil in the crank case being clearly shown on the rod.

A primary object of this invention is to provide a wiper for this rod which is readily accessible to the user for cleaning the rod before use, which cleaning operation may be accomplished by a single stroke or movement and without in any way handling of the wiper by the operator.

Another object of the invention is to so construct such a wiper that it may be attached at any desired point on the motor adjacent the oil testing opening in the crank case, and which is simple and cheap to manufacture, so that when worn, it may be readily discarded, and a new one substituted.

In carrying out these objects, the invention is susceptible of a wide range of modification without departing from the spirit or sacrificing any of the advantages of the claimed invention, there being shown in the drawings for illustrative purposes a preferred and practical form, in which:

Figure 1 represents a perspective view of a portion of an automobile engine with this improved wiper shown attached, Fig. 2 is a longitudinal section through the wiper and the adjacent portion of the engine where it is attached, Fig. 3 is a transverse section taken on the line 3—3 of Fig. 2, and Fig. 4 is a detail perspective view of the mounting plate for the wiper.

In the embodiment illustrated, an engine crank case 1 is shown having the usual oil testing opening 2 therein, provided with a suitable closure 3. Mounted on the flange 4 of the crank case by one of the securing bolts 5 is the oil gauge wiper 10 which constitutes this invention.

This wiper 10 comprises a mounting or base plate 11 constructed of any suitable metal, or other material, and having a bolt receiving opening 12 at one end, while the other end thereof has a longitudinally extending slot or recess in the form of a truncated V with the wide portion opening through the end of the plate. This opening 13 is designed to register with a V-shaped slot 16 formed in a pad 15 which is riveted or otherwise secured to the upper face of the plate 11. This pad 15 may be constructed of felt, or any suitable material, capable of absorbing grease, and the slot 16 therein is of less width than the opening 13 in the plate, so that when the rod is drawn through the slot 16, there is no danger of its contacting with the side edges of the opening 13.

The V-shaped slot 16 in the pad 15 has the side walls thereof converging toward the inner ends and at said ends they contact for a short distance to ensure the proper wiping of the rod when drawn between them.

From the above description, it will be obvious that this wiper may be mounted at any suitable or desired point, but as here shown is secured by one of the engine bolts 5 and may be readily removed when desired, and replaced by a new one.

Before the rod gauge is used in measuring the oil in the crank case, it will be inserted in the slot 16 and drawn therethrough between the walls which will effectively wipe off all surplus oil from the rod, leaving it perfectly clean so that the measurement of the height of the oil in the crank case will be indicated on the rod.

It will be obvious that this wiper will be ready every time the hood of the motor is raised for cleaning the gauge rod, and will be particularly useful for the car operator or for the filling station employee, when desiring to test the oil in the crank case.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

A device of the class described comprising a mounting plate having an inwardly tapered opening extending through one end thereof, a pad of absorbent material superposed on said plate and having a slot similarly shaped and registering with the opening in the plate, the walls of the pad-opening extending laterally beyond those of the plate opening and merging into contact at the inner end of the slot to provide contact elements for the gauge to be wiped, and means for mounting the plate on a support.

ALTON WILLIAM ASHWORTH.